United States Patent
Yang et al.

(10) Patent No.: US 11,539,832 B2
(45) Date of Patent: Dec. 27, 2022

(54) TERMINAL SCREEN-ON/OFF CONTROL METHOD AND APPARATUS, AND TERMINAL

(71) Applicant: Huawei Technologies Co., Ltd., Shenzhen (CN)

(72) Inventors: Jun Yang, Shenzhen (CN); Yuehai Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 16/755,701

(22) PCT Filed: Oct. 12, 2018

(86) PCT No.: PCT/CN2018/109954
§ 371 (c)(1),
(2) Date: Apr. 13, 2020

(87) PCT Pub. No.: WO2019/072223
PCT Pub. Date: Apr. 18, 2019

(65) Prior Publication Data
US 2020/0374388 A1    Nov. 26, 2020

(30) Foreign Application Priority Data
Oct. 13, 2017   (CN) ......................... 201710955161.X

(51) Int. Cl.
*H04M 1/73*      (2006.01)
*G06F 1/3234*    (2019.01)
(Continued)

(52) U.S. Cl.
CPC ............ *H04M 1/73* (2013.01); *G06F 1/3265* (2013.01); *G06F 3/0484* (2013.01); *H04M 1/72463* (2021.01); *H04M 1/72466* (2021.01)

(58) Field of Classification Search
CPC ............... H04M 1/73; H04M 1/72463; H04M 1/72466; H04M 1/72415; H04M 1/72454;
(Continued)

(56) References Cited

U.S. PATENT DOCUMENTS

2004/0125234 A1    7/2004  Kim
2013/0210358 A1*   8/2013  Chou ................ H04M 1/72412
                                                    455/41.2
(Continued)

FOREIGN PATENT DOCUMENTS

CN    102981622 A    3/2013
CN    105025560 A    11/2015
(Continued)

*Primary Examiner* — Lester G Kincaid
*Assistant Examiner* — Maryam Soltanzadeh
(74) *Attorney, Agent, or Firm* — Conley Rose, P.C.

(57) ABSTRACT

A terminal screen-on/off control method includes receiving an operation instruction that is sent by a user by using a first terminal; if the operation instruction meets a preset condition, determining a current state of a screen of a second terminal, and if the current state of the screen is on, controlling the second terminal to turn off the screen; or if the current state of the screen is off, controlling the second terminal to turn on the screen. The preset condition is used to determine whether the second terminal is to turn the screen on/off. The first terminal can be directly used to control the second terminal to turn the screen on/off. This operation is very simple.

20 Claims, 5 Drawing Sheets

(51) Int. Cl.
*G06F 3/0484* (2022.01)
*H04M 1/72463* (2021.01)
*H04M 1/72466* (2021.01)

(58) Field of Classification Search
CPC .... G06F 1/3265; G06F 3/0484; G06F 3/0487; Y02D 10/00; H04N 5/23206; H04N 5/23203; H04N 5/23216; H04N 5/225; H04N 5/232; G03B 17/563
See application file for complete search history.

(56) References Cited

U.S. PATENT DOCUMENTS

| | | | | |
|---|---|---|---|---|
| 2015/0126247 | A1* | 5/2015 | Kim | G06F 1/163 455/563 |
| 2015/0319289 | A1* | 11/2015 | Lee | H04M 1/724 455/418 |
| 2015/0347010 | A1* | 12/2015 | Yang | G06F 3/0488 715/765 |
| 2016/0334926 | A1* | 11/2016 | Gan | H04W 88/02 |
| 2018/0035296 | A1* | 2/2018 | Wu | H04M 1/72412 |
| 2019/0327407 | A1* | 10/2019 | Yu | F16M 11/06 |

FOREIGN PATENT DOCUMENTS

| | | | |
|---|---|---|---|
| CN | 106293308 | A | 1/2017 |
| CN | 106534496 | A | 3/2017 |
| CN | 107635053 | A | 1/2018 |
| JP | 2017191340 | A | 10/2017 |

* cited by examiner

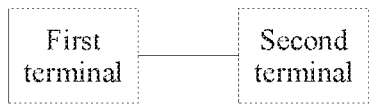
FIG. 1
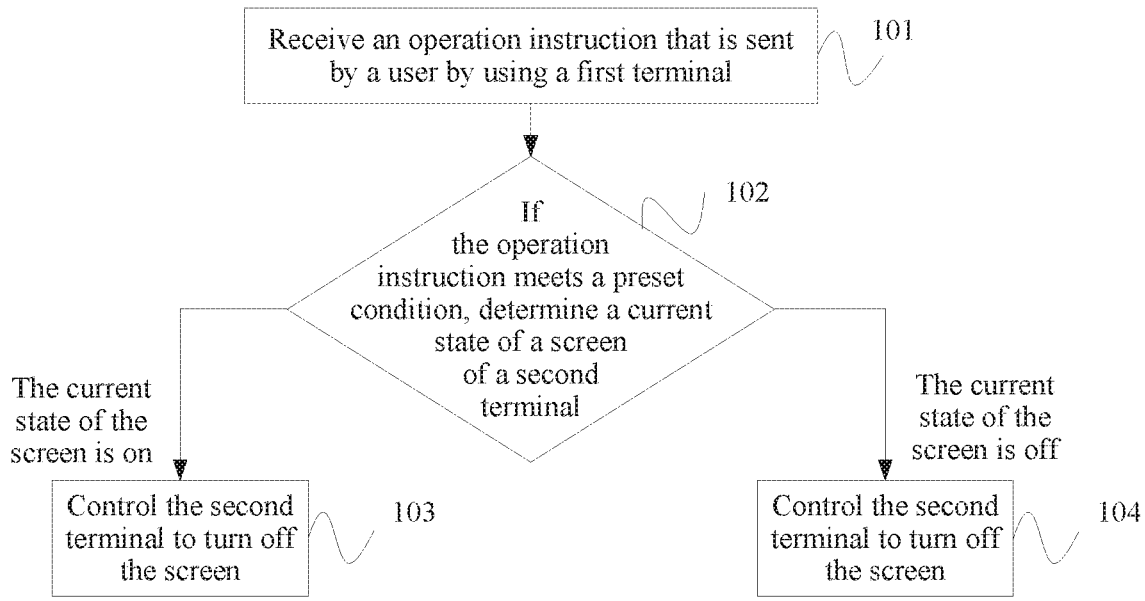
FIG. 2
FIG. 3

TERMINAL SCREEN-ON/OFF CONTROL METHOD AND APPARATUS, AND TERMINAL

CROSS-REFERENCE TO RELATED APPLICATIONS

This application is a National Stage of International Patent Application No. PCT/CN2018/109954 filed on Oct. 12, 2018, which claims priority to Chinese Patent Application No. 201710955161.X filed on Oct. 13, 2017. Both of the aforementioned applications are hereby incorporated by reference in their entireties.

TECHNICAL FIELD

This application relates to communications technologies, and in particular, to a terminal screen-on/off control method and apparatus and a terminal.

BACKGROUND

With development of science and technology, photographing using a terminal such as a camera, a mobile phone, or an iPad has become daily behavior of many users. To conveniently take a selfie, a selfie stick may be used for photographing. A plug is disposed on the selfie stick, and a button is disposed on a grip of the selfie stick. A mobile phone is used as an example. When the selfie stick is used, a function of photographing using the mobile phone can be implemented by inserting the plug into a headset jack of the mobile phone and pressing the button on the grip.

Currently, a common selfie stick is usually wire-controlled. An implementation principle of the wire-controlled selfie stick is as follows: When the selfie stick is inserted into a headset jack of a mobile phone, the mobile phone identifies the selfie stick as a headset. A button on a grip of the selfie stick is equivalent to a volume button of the headset. When a user presses the button on the grip of the selfie stick, the mobile phone identifies the press as that the user presses the volume button on the headset to implement photographing by pressing a shutter button of the mobile phone.

However, when using the selfie stick, the user needs to manually press a power button to turn a screen of the mobile phone on/off. Especially in traveling, the user needs to frequently turn the screen on/off. This operation is troublesome.

SUMMARY

Embodiments of this application provide a terminal screen-on/off control method and apparatus and a terminal, to directly use a first terminal to control a second terminal to turn a screen on/off, to achieve a very simple operation.

According to a first aspect, an embodiment of this application provides a terminal screen-on/off control method, including: receiving an operation instruction that is sent by a user by using a first terminal; and if the operation instruction meets a preset condition, determining a current state of a screen of a second terminal, and if the current state of the screen is on, controlling the second terminal to turn off the screen; or if the current state of the screen is off, controlling the second terminal to turn on the screen. The preset condition is used to determine whether the second terminal is to turn the screen on/off.

In this embodiment, the second terminal receives the operation instruction that is sent by the user by using the first terminal. If the operation instruction meets the preset condition, the current state of the screen of the second terminal is determined. If the current state of the screen is on, the second terminal is controlled to turn off the screen. If the current state of the screen is off, the second terminal is controlled to turn on the screen. The user does not need to manually press a power button of the second terminal to turn the screen on/off, but can directly use the first terminal to control the second terminal to turn the screen on/off. This operation is very simple.

Optionally, the controlling the second terminal to turn on the screen includes: controlling the second terminal to turn on the screen, and controlling a first application to respond to the operation instruction. The first application is an application that is last used and that is not closed by the user before the second terminal turns off the screen.

Optionally, the controlling the second terminal to turn on the screen, and controlling a first application to respond to the operation instruction includes: determining whether the first application runs in foreground before the second terminal turns off the screen: and if yes, controlling the second terminal to turn on the screen and unlock the screen to display an interface of the first application, and controlling the first application to respond to the operation instruction; or if no, controlling the second terminal to turn on the screen and display an interface of the first application in a screen-locked state, and controlling the first application to respond to the operation instruction.

In this embodiment, it is determined whether the first application runs in the foreground before the second terminal turns off the screen. If yes, the second terminal is controlled to turn on the screen and unlock the screen to display the interface of the first application, and the first application is controlled to respond to the operation instruction. If no, the second terminal is controlled to turn on the screen and display the interface of the first application in the screen-locked state, and the first application is controlled to respond to the operation instruction. The user can use the first terminal to control the second terminal to turn the screen on/off and control the second terminal to display an interface in a screen-unlocked state or an interface in a screen-locked state to respond to the operation instruction. This brings great convenience to the user. In particular, when there is no need to run the terminal, the user can conveniently turn off the screen so that the terminal enters a standby state, to reduce energy consumption.

Optionally, the controlling the second terminal to turn on the screen and unlock the screen to display an interface of the first application includes: if the second terminal turns off the screen due to a timeout or an operation instruction that is sent by the user by using the first terminal, controlling the second terminal to turn on the screen and unlock the screen to display the interface of the first application.

In this embodiment, if the second terminal turns off the screen due to a timeout or an operation instruction that is sent by the user by using the first terminal, the second terminal is controlled to turn on the screen and unlock the screen to display the interface of the first application, thereby ensuring security of user information. For example, when the user may not need to use the second terminal for a long time, the user may turn off the screen by pressing a power button. In this case, if a mobile phone is lost, another user without an unlocking password cannot unlock the mobile phone, thereby ensuring security of user information.

Optionally, if the operation instruction does not meet the preset condition, the method includes: determining the current state of the screen of the second terminal; and if the current state of the screen is on, responding, by the second terminal, to the operation instruction by using a second application, where the second application is an application that currently runs in foreground of the second terminal; or if the current state of the screen is off, skipping, by the second terminal, responding to the operation instruction.

In this embodiment, if the operation instruction does not meet the preset condition, the current state of the screen of the second terminal is determined. If the current state of the screen is on, the second terminal responds to the operation instruction by using the second application. If the current state of the screen is off, the second terminal does not respond to the operation instruction. The user can conveniently operate an application in the second terminal by using the first terminal. In addition, when the current state of the screen is off, the second terminal does not respond to the operation instruction, thereby effectively preventing a misoperation of the user and reducing energy consumption of the terminal.

Optionally, the preset condition includes: a preset button is touched and held longer than a preset time threshold.

Optionally, before the receiving an operation instruction that is sent by a user by using a first device, the method further includes: when detecting that the first terminal is connected to the second terminal, enabling, by the second terminal a function of turning the screen on/off by using a device connected to the second terminal. The function of turning the screen on/off by using a device connected to the second terminal is used to instruct the second terminal to turn the screen on/off based on the operation instruction sent by the first terminal.

In this embodiment, when detecting that the first terminal is connected to the second terminal, the second terminal automatically enables the function of turning the screen on/off by using a device connected to the second terminal. Therefore, the user may send the operation instruction to the second terminal by using the first terminal, so that the second terminal turns the screen on/off and even unlocks the screen based on the operation instruction. Only when detecting that the first terminal is connected to the second terminal, the second terminal enables the function of turning the screen on/off by using a device connected to the second terminal. Otherwise, the function does not need to be enabled. In this way, the user can conveniently control, by using a device connected to the second terminal, the second terminal to turn the screen on/off, and when there is no device connected to the second terminal, the function of turning the screen on/off by using a device connected to the second terminal is not enabled to reduce energy consumption.

According to a second aspect, an embodiment of this application provides a terminal screen-on/off control apparatus, including:

a receiving module, configured to receive an operation instruction that is sent by a user by using a first terminal; and a control module, configured to: if the operation instruction meets a preset condition, determine a current state of a screen of a second terminal, and if the current state of the screen is on, control the second terminal to turn off the screen; or if the current state of the screen is off, control the second terminal to turn on the screen, where the preset condition is used to determine whether the second terminal is to turn the screen on/off.

Optionally, the controlling, by the control module, the second terminal to turn on the screen includes: controlling, by the control module, the second terminal to turn on the screen, and controlling a first application to respond to the operation instruction. The first application is an application that is last used and that is not closed by the user before the second terminal turns off the screen.

Optionally, the control module is specifically configured to: determine whether the first application runs in foreground before the second terminal turns off the screen; and if yes, control the second terminal to turn on the screen and unlock the screen to display an interface of the first application, and control the first application to respond to the operation instruction; or if no, control the second terminal to turn on the screen and display an interface of the first application in a screen-locked state, and control the first application to respond to the operation instruction.

Optionally, the controlling, by the control module, the second terminal to turn on the screen and unlock the screen to display an interface of the first application includes: if it is determined that the second terminal turns off the screen due to a timeout or an operation instruction that is sent by the user by using the first terminal, controlling, by the control module, the second terminal to turn on the screen and unlock the screen to display the interface of the first application.

Optionally, if the operation instruction does not meet the preset condition, the control module is further configured to: determine the current state of the screen of the second terminal: and if the current state of the screen is on, respond to the operation instruction by using a second application, where the second application is an application that currently runs in foreground of the second terminal; or if the current state of the screen is off, skip responding to the operation instruction.

Optionally, the preset condition includes: a preset button is touched and held longer than a preset time threshold.

Optionally, the control module is further configured to: when it is detected that the first terminal is connected to the second terminal, enable a function of turning the screen on/off by using a device connected to the second terminal. The function of turning the screen on/off by using a device connected to the second terminal is used to instruct the second terminal to turn the screen on/off based on the operation instruction sent by the first terminal.

For an implementation principle and a beneficial effect of the apparatus provided in this embodiment, refer to the description in the first aspect. Details are not described herein again.

According to a third aspect, an embodiment of this application provides a terminal, including a processor and a memory, where the memory is configured to store an instruction, the processor is configured to execute the instruction stored in the memory, and when the processor executes the instruction stored in the memory, the apparatus is configured to execute the method described in any embodiment of the first aspect.

According to a fourth aspect, an embodiment of this application provides a terminal, including at least one processing element (or chip) configured to execute the method according to the first aspect or the implementations of the first aspect.

According to a fifth aspect, an embodiment of this application provides a readable storage medium. The readable storage medium stores an execution instruction. When at least one processor in a terminal executes the execution instruction, the terminal executes the terminal screen-on/off control method provided in the first aspect or the implementations of the first aspect.

According to a sixth aspect, an embodiment of this application provides a program product. The program product includes an execution instruction, and the execution instruction is stored in a readable storage medium. At least one processor in a terminal may read the execution instruction from the readable storage medium, and the at least one processor executes the execution instruction to enable the terminal to execute the terminal screen-on/off control method provided in the first aspect or the implementations of the first aspect.

According to a seventh aspect, an embodiment of this application provides a communications system. The network system includes at least one terminal in the foregoing aspects.

BRIEF DESCRIPTION OF DRAWINGS

FIG. 1 is a schematic diagram of an application scenario of a terminal screen-on/off control method according to an embodiment of this application;

FIG. 2 is a flowchart of a terminal screen-on/off control method according to an embodiment of this application:

FIG. 3 is a flowchart of a terminal screen-on/off control method according to another embodiment of this application;

DESCRIPTION OF EMBODIMENTS

Figure 4:
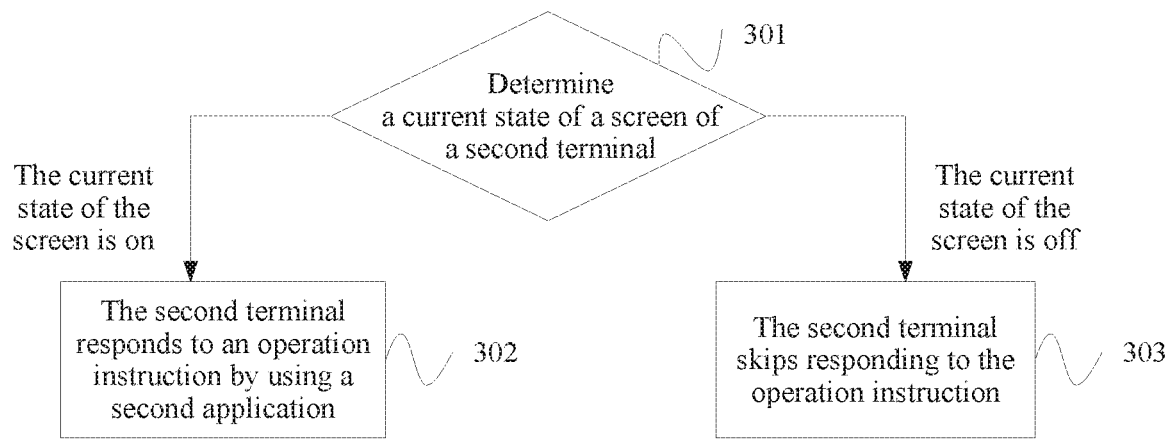
FIG. 4 is a flowchart of a terminal screen-on/off control method according to another embodiment of this application.

FIG. 1 is a schematic diagram of an application scenario of a terminal screen-on/off control method according to an embodiment of this application. As shown in FIG. 1, the scenario includes a first terminal and a second terminal. The first terminal can control the second terminal to turn a screen on/off. The second terminal may be a mobile phone, a computer, an iPad, a smart TV, a game console, or the like. The first terminal may be a headset, a selfie stick, a mobile phone, or the like. For example, a button of a selfie stick or a volume button of a headset may be used to turn on/off a screen of a mobile phone, and even unlock the screen of the mobile phone.

FIG. 2 is a flowchart of a terminal screen-on/off control method according to an embodiment of this application. The method is executed by a second terminal, and the second terminal may be a mobile phone, a computer, an iPad, a smart TV, a game console, or the like. As shown in FIG. 2, the method includes the following steps.

Step 101: Receive an operation instruction that is sent by a user by using a first terminal.

In this embodiment, the operation instruction may be an instruction sent by the user by performing an operation such as press and hold, quick press, click, or double touch on a physical button or a virtual button on the first terminal, or even may be an instruction sent by the user in a voice manner. The operation instruction is used to instruct the second terminal to respond to an operation of the user.

For example, if the first terminal is a selfie stick, and the second terminal is a mobile phone, the operation instruction may be an instruction generated by the user by pressing and holding a button on the selfie stick to instruct the mobile phone to turn a screen on/off.

Optionally, before step 101, the method may further include: when detecting that the first terminal is connected to the second terminal, enabling, by the second terminal, a function of turning a screen on/off by using a device connected to the second terminal.

The function of turning the screen on/off by using a device connected to the second terminal is used to instruct the second terminal to turn the screen on/off based on the operation instruction sent by the first terminal.

In this embodiment, when detecting that the first terminal is connected to the second terminal, the second terminal automatically enables the function of turning the screen on/off by using a device connected to the second terminal. Therefore, the user may send the operation instruction to the second terminal by using the first terminal, so that the second terminal turns the screen on/off and even unlocks the screen based on the operation instruction. Only when detecting that the first terminal is connected to the second terminal, the second terminal enables the function of turning the screen on/off by using a device connected to the second terminal. Otherwise, the function does not need to be enabled. In this way, the user can conveniently control, by using a device connected to the second terminal, the second terminal to turn the screen on/off, and when there is no device connected to the second terminal, the function of turning the screen on/off by using a device connected to the second terminal is not enabled to reduce energy consumption. For example, when a user is in a car and it is inconvenient to operate a mobile phone, a headset may be connected to the mobile phone to control, by using the headset, the mobile phone to turn a screen on/off. This operation is very convenient.

Optionally, when the second terminal fails to detect the first terminal, the second terminal automatically disables the function of turning the screen on/off by using a device connected to the second terminal, to reduce energy consumption of the terminal.

Step 102: If the operation instruction meets a preset condition, determine a current state of a screen of the second terminal. If the current state of the screen is on, step 103 is performed. If the current state of the screen is off, step 104 is performed.

The preset condition is used to determine whether the second terminal is to turn the screen on/off.

In this embodiment, a determining condition may be preset. When the operation instruction sent by the user by using the first terminal meets the preset condition, the second terminal is instructed to turn the screen on/off.

Optionally, the preset condition includes: a preset button is touched and held longer than a preset time threshold. For example, a preset time threshold is 3 s. If the user presses and holds the button on the selfie stick longer than 3 s, the operation instruction meets the preset condition, and the second terminal determines the current state of the screen. If the current state of the screen is on, the second terminal is controlled to turn off the screen. If the current state of the screen is off, the second terminal is controlled to turn on the screen.

Optionally, the preset condition may alternatively include: a quantity of consecutive button presses exceeds a preset quantity threshold, a voice input by the user matches a preset voice, or the like. For example, the first terminal is a headset, the second terminal is a mobile phone, and the preset quantity threshold is 2. If the user consecutively presses a volume button of the headset twice, the operation instruction meets the preset condition. Alternatively, the first terminal is a mobile phone, the second terminal is a computer, and the preset voice is "turn the screen on/off". If the user inputs, by using the mobile phone, a voice of "control the computer to turn the screen on/of", the operation instruction meets the preset condition.

Step 103: Control the second terminal to turn off the screen.

In this embodiment, when the operation instruction sent by the user by using the first terminal meets the preset condition, and the current state of the screen of the second terminal is on, the second terminal turns off the screen.

Step 104: Control the second terminal to turn on the screen.

In this embodiment, when the operation instruction sent by the user by using the first terminal meets the preset condition, and the current state of the screen of the second terminal is off, the second terminal turns on the screen.

In the terminal screen-on/off control method provided in this embodiment of this application, the operation instruction sent by the user by using the first terminal is received. If the operation instruction meets the preset condition, the current state of the screen of the second terminal is determined. If the current state of the screen is on, the second terminal is controlled to turn off the screen. If the current state of the screen is off, the second terminal is controlled to turn on the screen. The user does not need to manually press a power button of the second terminal to turn the screen on/off, but can directly use the first terminal to control the second terminal to turn the screen on/off. This operation is very simple.

Optionally, step 104 "controlling the second terminal to turn on the screen" includes: controlling the second terminal to turn on the screen, and controlling a first application to respond to the operation instruction. The first application is an application that is last used and that is not closed by the user before the second terminal turns off the screen.

In this embodiment, when the operation instruction sent by the user by using the first terminal meets the preset condition, and the current state of the screen of the second terminal is off, the second terminal turns on the screen, and may further control the application that is last used by the user and that is not closed before the screen of the second terminal is turned off to respond to the operation instruction.

For example, when the second terminal is controlled to turn on the screen, the second terminal may further unlock the screen of the second terminal, and display an interface of an application running in foreground. As shown in FIG. 3, an implementation of the step "controlling the second terminal to turn on the screen, and controlling a first application to respond to the operation instruction" may include the following steps.

Step 201: Determine whether the first application runs in foreground before the second terminal turns off the screen. If yes, step 202 is performed. If no, step 203 is performed.

The first application is the application that is last used by the user before the second terminal turns off the screen.

In this embodiment, an application may run in the foreground before the second terminal turns off the screen. For example, the first terminal is a mobile phone, and the first application is a camera. When travelling, the user often starts the camera for photographing, and for convenience of photographing next time, the user often directly turns off the screen when the camera application is running in the foreground. For another example, the first terminal is a mobile phone, and the first application is WeChat. The user also directly turns off the screen when the WeChat application is running in the foreground.

Step 202: Control the second terminal to turn on the screen and unlock the screen to display an interface of the first application, and control the first application to respond to the operation instruction.

In this embodiment, if the first application runs in the foreground before the second terminal turns off the screen, when the second terminal is controlled to turn on the screen, the second terminal directly unlocks the screen to display the interface of the first application to respond to the operation. For example, if the camera is running in the foreground before the screen of the mobile phone is turned off, when the user presses and holds a button on the selfie stick to turn on the screen, the mobile phone automatically unlocks the screen to display a camera photographing interface. If the operation instruction instructs the mobile phone to perform photographing, the mobile phone directly performs photographing after the camera interface is displayed.

Optionally, an implementation of the step "controlling the second terminal to turn on the screen and unlock the screen to display an interface of the first application" includes: if the second terminal turns off the screen due to a timeout or an operation instruction sent by the user by using the first terminal, the second terminal is controlled to turn on the screen and unlock the screen to display the interface of the first application.

In this embodiment, after it is determined that the first application runs in the foreground before the second terminal turns off the screen, the second terminal further needs to determine why the second terminal turns off the screen. If the second terminal turns off the screen due to a timeout or an operation instruction sent by the user by using the first terminal, the second terminal is controlled to turn on the screen and unlock the screen to display the interface of the first application. For example, the second terminal is a mobile phone, and the first application is WeChat. When the user does not operate the mobile phone for a long time, the screen of the mobile phone is automatically turned off, or the user turns off the screen of the mobile phone by pressing and holding a volume button of a headset. When the user presses and holds the volume button of the headset again, the mobile phone turns on the screen and unlocks the screen to display an interface of WeChat.

Optionally, if the screen of the second terminal is turned off due to neither a timeout nor an operation instruction sent by the user by using the first terminal, but turned off in another manner, the second terminal does not respond to the operation instruction, or the second terminal turns on the screen, and displays an interface in a screen-locked state. For example, the second terminal is a mobile phone, and the first terminal is a selfie stick. After the user turns off the screen of the mobile phone by pressing a power button, when the user presses and holds a button on the selfie stick, the screen of the mobile phone may be turned on but locked, or the mobile phone does not respond to the operation, and is still in a screen-off state.

In this embodiment, if the second terminal turns off the screen due to a timeout or an operation instruction sent by the user by using the first terminal, the second terminal is controlled to turn on the screen and unlock the screen to display the interface of the first application, thereby ensuring security of user information. For example, when the user may not need to use the second terminal for a long time, the user may turn off the screen by pressing a power button. In this case, if a mobile phone is lost, another user without an unlocking password cannot unlock the mobile phone, thereby ensuring security of user information.

Step 203: Control the second terminal to turn on the screen and display an interface of the first application in a screen-locked state, and control the first application to respond to the operation instruction.

In this embodiment, if the first application runs in background before the second terminal turns off the screen, when the second terminal is controlled to turn on the screen, the second terminal directly displays the interface of the first application in the screen-locked state. For example, if the camera runs in background before the mobile phone turns off the screen, when the user turns on the screen by pressing and holding the button on the selfie stick, the mobile phone displays a photographing interface in a screen-locked state, and responds to an operation instruction of instructing to perform photographing. It should be noted that, in the photographing interface in the screen-locked state, the user can still control, by using the first terminal, the second terminal to perform photographing, but cannot browse a historical picture. For example, when the mobile phone displays the photographing interface in the screen-locked state, if the user presses the button on the selfie stick, the second terminal performs photographing, but the user cannot view a photographed picture.

In the terminal screen-on/off control method provided in this embodiment of this application, it is determined whether the first application runs in the foreground before the second terminal turns off the screen. If yes, the second terminal is controlled to turn on the screen and unlock the screen to display the interface of the first application, and the first application is controlled to respond to the operation instruction. If no, the second terminal is controlled to turn on the screen and display the interface of the first application in the screen-locked state, and the first application is controlled to respond to the operation instruction. The user can use the first terminal to control the second terminal to turn the screen on/off, and control the second terminal to display an interface in a screen-unlocked state or an interface in a screen-locked state to respond to the operation instruction. This brings great convenience to the user. In particular, when there is no need to run the terminal, the user can conveniently turn off the screen so that the terminal enters a standby state, to reduce energy consumption.

FIG. 4 is a flowchart of a terminal screen-on/off control method according to another embodiment of this application. As shown in FIG. 4, if the operation instruction does not meet the preset condition, the method may include the following steps.

Step 301: Determine the current state of the screen of the second terminal. If the current state of the screen is on, step 302 is performed. If the current state of the screen is off, step 303 is performed.

In this embodiment, if the operation instruction sent by the user to the second terminal by using the first terminal does not meet the preset condition, the current state of the screen of the second terminal is determined. For example, the preset condition is that a preset button is pressed and held longer than 3 s, the first terminal is a selfie stick, and the second terminal is a mobile phone. If the user presses a button on the selfie stick less than 3 s, the current state of the screen of the second terminal is determined.

Step 302: The second terminal responds to the operation instruction by using a second application.

The second application is an application that currently runs in foreground of the second terminal.

In this embodiment, if the current state of the screen is on, the second application currently running in the foreground responds to the operation instruction. For example, the preset condition is that a preset button is pressed and held longer than 3 s, the first terminal is a selfie stick, the second terminal is a mobile phone, and the second application is a camera. If the user presses a button on the selfie stick is, the camera performs a function of photographing.

Step 303: The second terminal skips responding to the operation instruction.

In this embodiment, if the current state of the screen is off, the second terminal does not respond to the operation instruction. For example, the preset condition is that a preset button is pressed and held longer than 3 s, the first terminal is a selfie stick, and the second terminal is a mobile phone. If the user presses a button on the selfie stick 1 s, the mobile phone is still in a screen-off state.

In the terminal screen-on/off control method provided in this embodiment of this application, if the operation instruction does not meet the preset condition, the current state of the screen of the second terminal is determined. If the current state of the screen is on, the second terminal responds to the operation instruction by using the second application. If the current state of the screen is off, the second terminal does not respond to the operation instruction. The user can conveniently operate an application in the second terminal by using the first terminal. In addition, when the current state of the screen is off, the second terminal does not respond to the operation instruction, thereby effectively preventing a misoperation of the user and reducing energy consumption of the terminal.

Figure 5:
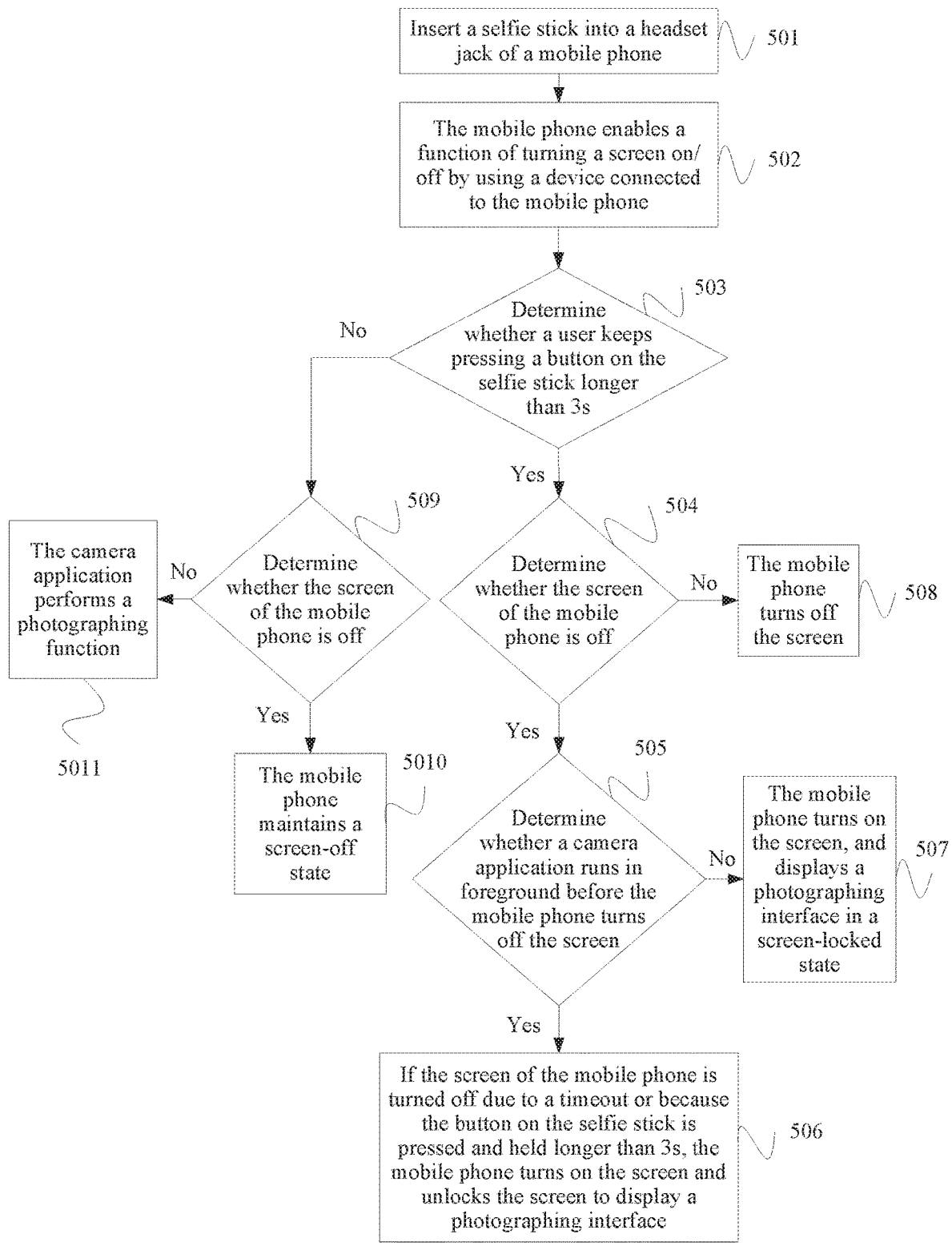
FIG. 5 is a flowchart of a terminal screen-on/off control method according to another embodiment of this application.

FIG. 5 is a flowchart of a terminal screen-on/off control method according to another embodiment of this application. In this embodiment, an implementation of the terminal screen-on/off control method in this application is described in detail by using an example in which a first terminal is a selfie stick and a second terminal is a mobile phone. As shown in FIG. 5, the method may include the following steps.

Step 501: Insert the selfie stick into a headset jack of the mobile phone.

Step 502: The mobile phone enables a function of turning a screen on/off by using a device connected to the mobile phone.

In this embodiment, internal hardware of the mobile phone supports interrupt wake-up using a volume button or sets a time trigger interrupt wake-up function. In other words, the mobile phone may be woken up by using the volume button to turn on the screen. When the selfie stick is inserted into the headset jack of the mobile phone, the mobile phone identifies the selfie stick as a headset. When a user presses a button on the selfie stick, the mobile phone identifies the press as an operation on the volume button.

Step 503: Determine whether a user keeps pressing a button on the selfie stick longer than 3 s. If yes, step 504 is performed. If no, step 509 is performed.

Step 504: Determine whether the screen of the mobile phone is off. If yes, step 505 is performed. If no, step 508 is performed.

Step 505: Determine whether a camera application runs in foreground before the mobile phone turns off the screen. If yes, step 506 is performed. If no, step 507 is performed.

Step 506: If the screen of the mobile phone is turned off due to a timeout or because the button on the selfie stick is pressed and held longer than 3 s, the mobile phone turns on the screen and unlocks the screen to display a photographing interface.

In this embodiment, the camera application in the mobile phone may be added to a screen locking/unlocking whitelist. If the volume button is used to turn off the screen when the photographing application is enabled, when the volume button is used to turn on the screen, the photographing interface may be directly displayed without unlocking the screen. Similarly, applications such as WeChat and QQ may be added to the screen locking/unlocking whitelist.

Step 507: The mobile phone turns on the screen, and displays a photographing interface in a screen-locked state.

Step 508: The mobile phone turns off the screen.

Step 509: Determine whether the screen of the mobile phone is off. If yes, step 5010 is performed. If no, step 5011 is performed.

Step 5010: The mobile phone maintains a screen-off state.

Step 5011: The camera application performs a photographing function.

In this embodiment, for an application in another terminal, the method may also be used to quickly turn a screen on/off and unlock the screen to provide a user setting interface, or quickly turn a screen on/off and unlock the screen by using a volume button, and so on.

Figure 6:
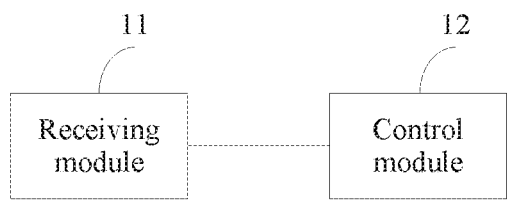
FIG. 6 is a block diagram of a terminal screen-on/off control apparatus according to an embodiment of this application.

FIG. 6 is a block diagram of a terminal screen-on/off control apparatus according to an embodiment of this application. As shown in FIG. 6, the apparatus includes:

a receiving module 11, configured to receive an operation instruction that is sent by a user by using a first terminal: and a control module 12, configured to: if the operation instruction meets a preset condition, determine a current state of a screen of a second terminal, and if the current state of the screen is on, control the second terminal to turn off the screen; or if the current state of the screen is off, control the second terminal to turn on the screen, where the preset condition is used to determine whether the second terminal is to turn the screen on/off.

In the terminal screen-on/off control apparatus provided in this embodiment of this application, the receiving module 11 receives the operation instruction that is sent by the user by using the first terminal, and if the operation instruction meets the preset condition, the control module 12 determines the current state of the screen of the second terminal. If the current state of the screen is on, the control module 12 controls the second terminal to turn off the screen. If the current state of the screen is off, the control module 12 controls the second terminal to turn on the screen. The user does not need to manually press a power button of the second terminal to turn the screen on/off, but can directly use the first terminal to control the second terminal to turn the screen on/off. This operation is very simple.

Optionally, the controlling, by the control module 12, the second terminal to turn on the screen includes:

controlling, by the control module, the second terminal to turn on the screen, and controlling a first application to respond to the operation instruction, where the first application is an application that is last used and that is not closed by the user before the second terminal turns off the screen.

Optionally, the control module 12 is specifically configured to determine whether the first application runs in foreground before the second terminal turns off the screen. If yes, the control module 12 controls the second terminal to turn on the screen and unlock the screen to display an interface of the first application, and controls the first application to respond to the operation instruction. If no, the control module 12 controls the second terminal to turn on the screen and display an interface of the first application in a screen-locked state, and controls the first application to respond to the operation instruction.

In the terminal screen-on/off control apparatus provided in this embodiment of this application, the control module 12 determines whether the first application runs in the foreground before the second terminal turns off the screen. If yes, the control module 12 controls the second terminal to turn on the screen and unlock the screen to display the interface of the first application, and controls the first application to respond to the operation instruction. If no, the control module 12 controls the second terminal to turn on the screen and display the interface of the first application in the screen-locked state, and controls the first application to respond to the operation instruction. The user can use the first terminal to control the second terminal to turn the screen on/off, and control the second terminal to display an interface in a screen-unlocked state or an interface in a screen-locked state to respond to the operation instruction. This brings great convenience to the user. In particular, when there is no need to run the terminal, the user can conveniently turn off the screen so that the terminal enters a standby state, to reduce energy consumption.

Optionally, the controlling, by the control module 12, the second terminal to turn on the screen and unlock the screen to display an interface of the first application includes:

if it is determined that the second terminal turns off the screen due to a timeout or an operation instruction that is sent by the user by using the first terminal, controlling, by the control module 12, the second terminal to turn on the screen and unlock the screen to display the interface of the first application.

In this embodiment, if it is determined that the second terminal turns off the screen due to a timeout or an operation instruction sent by the user by using the first terminal, the control module 12 controls the second terminal to turn on the screen and unlock the screen to display the interface of the first application, thereby ensuring security of user information. For example, when the user may not need to use the second terminal for a long time, the user may turn off the screen by pressing a power button. In this case, if a mobile phone is lost, another user without an unlocking password cannot unlock the mobile phone, thereby ensuring security of user information.

Optionally, if the operation instruction does not meet the preset condition, the control module 12 is further configured to: determine the current state of the screen of the second terminal: and if the current state of the screen is on, respond to the operation instruction by using a second application, where the second application is an application that currently runs in foreground of the second terminal; or if the current state of the screen is off, skip responding to the operation instruction.

In the terminal screen-on/off control apparatus provided in this embodiment of this application, if the operation instruction does not meet the preset condition, the control module 12 determines the current state of the screen of the second terminal. If the current state of the screen is on, the second terminal responds to the operation instruction by using the second application. If the current state of the screen is off, the second terminal does not respond to the operation instruction. The user can conveniently operate an application in the second terminal by using the first terminal. In addition, when the current state of the screen is off, the second terminal does not respond to the operation instruction, thereby effectively preventing a misoperation of the user and reducing energy consumption of the terminal.

Optionally, the preset condition includes: a preset button is touched and held longer than a preset time threshold.

Optionally, the control module 12 is further configured to: when it is detected that the first terminal is connected to the second terminal, enable a function of turning the screen on/off by using a device connected to the second terminal.

The function of turning the screen on/off by using a device connected to the second terminal is used to instruct the second terminal to turn the screen on/off based on the operation instruction sent by the first terminal.

In this embodiment, when it is detected that the first terminal is connected to the second terminal, the control module 12 automatically enables the function of turning the screen on/off by using a device connected to the second terminal. Therefore, the user may send the operation instruction to the second terminal by using the first terminal, so that the second terminal turns the screen on/off and even unlocks the screen based on the operation instruction. Only when it is detected that the first terminal is connected to the second terminal, the control module 12 enables the function of turning the screen on/off by using a device connected to the second terminal. Otherwise, the function does not need to be enabled. In this way, the user can conveniently control, by using a device connected to the second terminal, the second terminal to turn the screen on/off, and when there is no device connected to the second terminal, the function of turning the screen on/off by using a device connected to the second terminal is not enabled to reduce energy consumption. For example, when a user is in a car and it is inconvenient to operate a mobile phone, a headset may be connected to the mobile phone to control, by using the headset, the mobile phone to turn a screen on/off. This operation is very convenient.

Figure 7:
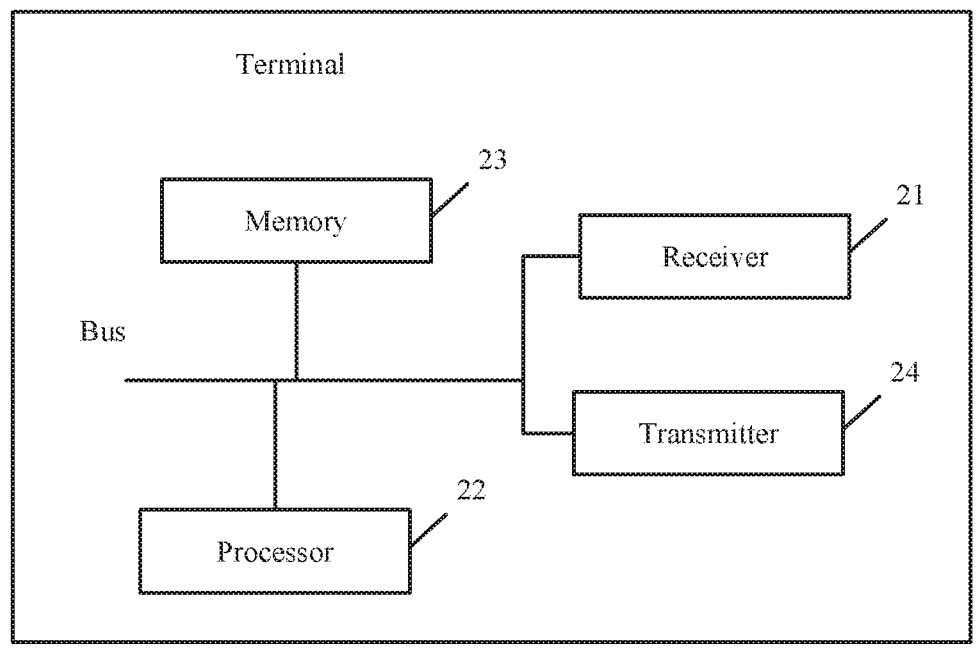
FIG. 7 is a block diagram of a terminal according to an embodiment of this application.

FIG. 7 is a block diagram of a terminal according to an embodiment of this application. The terminal is the second terminal in the foregoing embodiments. As shown in FIG. 7, the terminal includes:

a receiver 21, configured to receive an operation instruction that is sent by a user by using a first terminal: and a processor 22, configured to: if the operation instruction meets a preset condition, determine a current state of a screen of a second terminal, and if the current state of the screen is on, control the second terminal to turn off the screen: or if the current state of the screen is off, control the second terminal to turn on the screen, where the preset condition is used to determine whether the second terminal is to turn the screen on/off.

In the terminal provided in this embodiment of this application, the transmitter 21 receives the operation instruction that is sent by the user by using the first terminal, and if the operation instruction meets the preset condition, the processor 22 determines the current state of the screen of the second terminal. If the current state of the screen is on, the processor 22 controls the second terminal to turn off the screen. If the current state of the screen is off, the processor 22 controls the second terminal to turn on the screen. The user does not need to manually press a power button of the second terminal to turn the screen on/off, but can directly use the first terminal to control the second terminal to turn the screen on/off. This operation is very simple.

Optionally, the controlling, by the processor 22, the second terminal to turn on the screen includes:

controlling, by the control module, the second terminal to turn on the screen, and controlling a first application to respond to the operation instruction, where the first application is an application that is last used and that is not closed by the user before the second terminal turns off the screen.

Optionally, the processor 22 is specifically configured to determine whether the first application runs in foreground before the second terminal turns off the screen: and if yes, control the second terminal to turn on the screen and unlock the screen to display an interface of the first application, and control the first application to respond to the operation instruction; or if no, control the second terminal to turn on the screen and display an interface of the first application in a screen-locked state, and control the first application to respond to the operation instruction.

In the terminal screen-on/off control apparatus provided in this embodiment of this application, the processor 22 determines whether the first application runs in the foreground before the second terminal turns off the screen. If yes, the processor 22 controls the second terminal to turn on the screen and unlock the screen to display the interface of the first application, and controls the first application to respond to the operation instruction. If no, the processor 22 controls the second terminal to turn on the screen and display the interface of the first application in the screen-locked state, and controls the first application to respond to the operation instruction. The user can use the first terminal to control the second terminal to turn the screen on/off, and control the second terminal to display an interface in a screen-unlocked state or an interface in a screen-locked state to respond to the operation instruction. This brings great convenience to the user. In particular, when there is no need to run the terminal, the user can conveniently turn off the screen so that the terminal enters a standby state, to reduce energy consumption.

Optionally, the controlling, by the processor 22, the second terminal to turn on the screen and unlock the screen to display an interface of the first application includes:

if it is determined that the second terminal turns off the screen due to a timeout or an operation instruction that is sent by the user by using the first terminal, controlling, by the processor 22, the second terminal to turn on the screen and unlock the screen to display the interface of the first application.

In this embodiment, if it is determined that the second terminal turns off the screen due to a timeout or an operation instruction sent by the user by using the first terminal, the processor 22 controls the second terminal to turn on the screen and unlock the screen to display the interface of the first application, thereby ensuring security of user information. For example, when the user may not need to use the second terminal for a long time, the user may turn off the screen by pressing a power button. In this case, if a mobile phone is lost, another user without an unlocking password cannot unlock the mobile phone, thereby ensuring security of user information.

Optionally, if the operation instruction does not meet the preset condition, the processor 22 is further configured to: determine the current state of the screen of the second terminal; and if the current state of the screen is on, respond to the operation instruction by using a second application, where the second application is an application that currently runs in foreground of the second terminal; or if the current state of the screen is off, skip responding to the operation instruction.

In the terminal screen-on/off control apparatus provided in this embodiment of this application, if the operation instruction does not meet the preset condition, the processor 22 determines the current state of the screen of the second terminal. If the current state of the screen is on, the second terminal responds to the operation instruction by using the second application. If the current state of the screen is off, the second terminal does not respond to the operation instruction. The user can conveniently operate an application in the second terminal by using the first terminal. In addition, when the current state of the screen is off, the second terminal does not respond to the operation instruction, thereby effectively preventing a misoperation of the user and reducing energy consumption of the terminal.

Optionally, the preset condition includes: a preset button is touched and held longer than a preset time threshold.

Optionally, the processor 22 is further configured to: when it is detected that the first terminal is connected to the second terminal, enable a function of turning the screen on/off by using a device connected to the second terminal.

The function of turning the screen on/off by using a device connected to the second terminal is used to instruct the second terminal to turn the screen on/off based on the operation instruction sent by the first terminal.

In this embodiment, when it is detected that the first terminal is connected to the second terminal, the processor 22 automatically enables the function of turning the screen on/off by using a device connected to the second terminal. Therefore, the user may send the operation instruction to the second terminal by using the first terminal, so that the second terminal turns the screen on/off and even unlocks the screen based on the operation instruction. Only when it is detected that the first terminal is connected to the second terminal, the processor 22 enables the function of turning the screen on/off by using a device connected to the second terminal. Otherwise, the function does not need to be enabled. In this way, the user can conveniently control, by using a device connected to the second terminal, the second terminal to turn the screen on/off, and when there is no device connected to the second terminal, the function of turning the screen on/off by using a device connected to the second terminal is not enabled to reduce energy consumption. For example, when a user is in a car and it is inconvenient to operate a mobile phone, a headset may be connected to the mobile phone to control, by using the headset, the mobile phone to turn a screen on/off. This operation is very convenient.

Optionally, as shown in FIG. 7, the apparatus may further include a memory 23 and a transmitter 24. The memory 23 is configured to store data, and the transmitter 24 is configured to communicate with another device.

An embodiment of this application further provides a terminal, including a processor and a memory. The memory is configured to store an instruction, and the processor is configured to execute the instruction stored in the memory. When the processor executes the instruction stored in the memory, the apparatus is configured to execute the method in any one of the embodiments in FIG. 2 to FIG. 5.

An embodiment of this application further provides a computer storage medium, on which a program is stored. When the program is invoked by a processor to implement the method described in any one of the embodiments in FIG. 2 to FIG. 5.

It should be understood that division of the modules or units of the foregoing communications apparatus is merely division of logical functions. During actual implementation, all or some of the modules or units may be integrated into a physical entity, or may be physically separated. Moreover, these modules may be all implemented in a form of software invoked by a processing element, or may be all implemented in a form of hardware, or some modules may be implemented in a form of software invoked by a processing element, and some modules may be implemented in a form of hardware. For example, the processing module may be a separately disposed processing element, or may be integrated into a chip of a network device or a terminal for implementation. In addition, the processing module may be stored in a memory of a network device or a terminal in a form of a program, and a processing element in the network device or the terminal invokes and executes the program to implement functions of the foregoing units. Another module or unit is implemented similarly. In addition, all or some of these modules or units may be integrated, or may be implemented independently. The processing element herein may be an integrated circuit and has a capability to process a signal. In an implementation process, steps in the foregoing methods or the foregoing modules or units can be implemented by using an integrated logical circuit of hardware in the processing element, or by using instructions in a form of software.

For example, the foregoing modules or units may be one or more integrated circuits configured to implement the foregoing methods, for example, one or more application-specific integrated circuits (Application-Specific Integrated Circuit, ASIC), one or more microprocessors (digital signal processor, DSP), or one or more field programmable gate arrays (Field Programmable Gate Array, FPGA). For another example, when the foregoing module or unit is implemented by a processing element by scheduling a program, the processing element may be a general-purpose processor, for example, a central processing unit (Central Processing Unit, CPU) or another processor that can invoke a program. For another example, these modules or units may be integrated in a form of a system-on-a-chip (system-on-a-chip, SOC).

Figure 8:
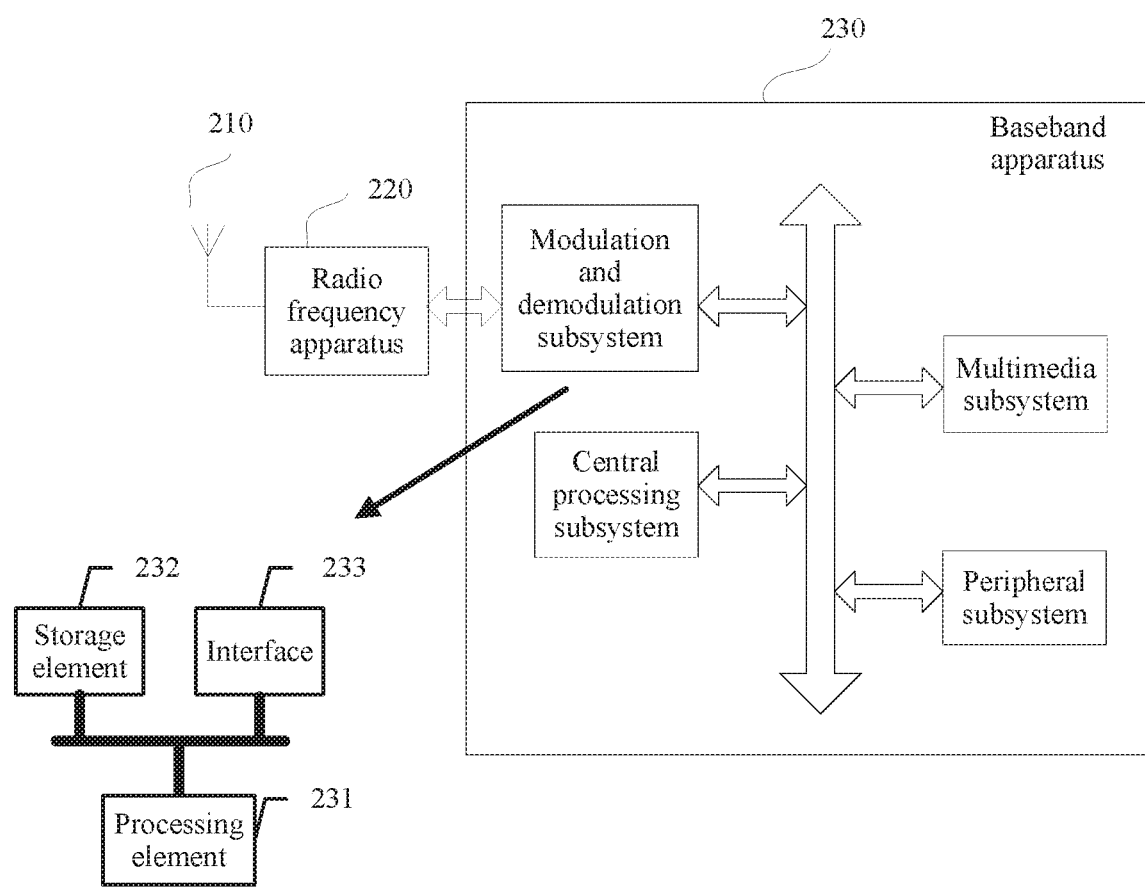
FIG. 8 is a schematic structural diagram of a terminal according to an embodiment of this application.

FIG. 8 is a schematic structural diagram of a terminal according to an embodiment of this application. The terminal may be the terminal in the foregoing embodiment, and is configured to implement an operation of the terminal in the foregoing embodiment. As shown in FIG. 8, the terminal includes an antenna 210, a radio frequency apparatus 220, and a baseband apparatus 230. The antenna 210 is connected to the radio frequency apparatus 220. In a downlink direction, the radio frequency apparatus 220 receives, by using the antenna 210, information sent by a RAN node, and sends, to the baseband apparatus 230 for processing, the information sent by the RAN node. In an uplink direction, the baseband apparatus 230 processes information of the terminal, and sends the information to the radio frequency apparatus 220. After processing the information of the terminal, the radio frequency apparatus 220 sends the information to the RAN node by using the antenna 210.

The baseband apparatus may include a modulation and demodulation subsystem, configured to implement processing on each communications protocol layer for data. The baseband apparatus may further include a central processing subsystem, configured to implement processing on a terminal operating system and an application layer. In addition, the baseband apparatus may further include another subsystem such as a multimedia subsystem or a peripheral subsystem. The multimedia subsystem is configured to control a camera or a screen display of the terminal, and the peripheral subsystem is configured to implement a connection to another device. The modulation and demodulation subsystem may be a chip separately disposed. Optionally, the foregoing communications apparatus may be implemented on the modulation and demodulation subsystem.

In one implementation, each unit shown in FIG. 8 is implemented by a processing element by scheduling a program. For example, a subsystem of the baseband apparatus 230, such as the modulation and demodulation subsystem, includes a processing element 231 and a storage element 232. The processing element 231 invokes a program stored in the storage element 232 to execute the methods executed by the terminal in the foregoing method embodiments. In addition, the baseband apparatus 230 may further include an interface 233, configured to exchange information with the radio frequency apparatus 220.

In another implementation, each unit shown in FIG. 8 may be one or more processing elements configured to implement the foregoing methods executed by the terminal. These processing elements are disposed on a subsystem of the baseband apparatus 230, such as the modulation and demodulation subsystem. The processing element herein may be an integrated circuit, for example, one or more ASICs, one or more DSPs, or one or more FPGAs. These integrated circuits may be integrated to form a chip.

For example, each unit shown in FIG. 8 may be integrated in a form of a system-on-a-chip (system-on-a-chip, SOC). For example, the baseband apparatus 230 includes a SOC chip, to implement the foregoing methods. The processing element 231 and the storage element 232 may be integrated into the chip, and the processing element 231 invokes a program stored in the storage element 232 to implement the foregoing methods executed by the terminal or functions of each module or unit shown in any one of the embodiments in FIG. 2 to FIG. 5. Alternatively, at least one integrated circuit may be integrated into the chip, to implement the foregoing methods executed by the terminal or functions of each module or unit shown in any one of the embodiments in FIG. 2 to FIG. 5. Alternatively, the foregoing implementations may be combined, functions of some units are implemented by a processing element by scheduling a program, and functions of some units are implemented by an integrated circuit.

In any manner, in summary, the foregoing communications apparatus used for the terminal includes at least one processing element and at least one storage element, and the at least one processing element is configured to execute the methods executed by the terminal provided in the foregoing method embodiments. The processing element may perform, in a first manner, that is, by running a program stored in the storage element, some or all steps performed by the terminal in the foregoing method embodiments; or may perform, in a second manner, that is, by using a hardware-integrated logical circuit in a processor element and an instruction, some or all steps performed by the terminal in the foregoing method embodiments; or certainly, may perform, by combining the first manner and the second manner, some or all steps performed by the terminal in the foregoing method embodiments.

As described above, the processing element herein may be a general-purpose processor, for example, a central processing unit (Central Processing Unit, CPU), or may be one or more integrated circuits configured to implement the foregoing methods, for example, one or more application-specific integrated circuits (Application-Specific Integrated Circuit, ASIC), one or more microprocessors (digital signal processor, DSP), or one or more field programmable gate arrays (Field Programmable Gate Array, FPGA).

The storage element may be a memory, or a general name of a plurality of storage elements.

What is claimed is:

1. A terminal screen-on/off control method, comprising:
   receiving an operation instruction from a user using a first terminal;
   determining a current state of a screen of a second terminal when the operation instruction meets a preset condition, wherein the preset condition comprises a preset button is touched and held longer than a preset time threshold, and determining whether the second terminal is to turn the screen on/off;
   controlling, using the first terminal, the second terminal to turn off the screen when the current state of the screen is on;
   controlling, using the first terminal, the second terminal to turn on the screen, controlling a first application to respond to the operation instruction, and determining whether the first application runs in a foreground before the second terminal turns off the screen when the current state of the screen is off, wherein the first application is last used and that is not closed by the user before the second terminal turns off the screen;
   controlling, using the first terminal, the second terminal to turn on the screen and unlock the screen to display an interface of the first application, and controlling the first application to respond to the operation instruction in response to the first application running in the foreground; and
   controlling, using the first terminal, the second terminal to turn on the screen and display the interface of the first application in a screen-locked state, and controlling the first application to respond to the operation instruction in response to the first application not running in the foreground.

2. The terminal screen-on/off control method of claim 1, further comprising controlling, using the first terminal, the second terminal to turn on the screen and unlock the screen to display the interface of the first application when the second terminal turns off the screen due to a timeout or the operation instruction from the user using the first terminal.

3. The terminal screen-on/off control method of claim 1, wherein when the operation instruction does not meet the preset condition, the terminal screen-on/off control method further comprises:
   determining the current state of the screen of the second terminal; and
   responding, by the second terminal, to the operation instruction using a second application when the current state of the screen is on, wherein the second application currently runs in the foreground of the second terminal.

4. The terminal screen-on/off control method of claim 1, further comprising enabling, by the second terminal, a function of turning the screen on/off using a device connected to the second terminal when detecting that the first terminal is connected to the second terminal, wherein the function instructs the second terminal to turn the screen on/off based on the operation instruction.

5. The terminal screen-on/off control method of claim 1, wherein when the operation instruction does not meet the preset condition, the terminal screen-on/off control method further comprises:
   determining the current state of the screen of the second terminal; and
   skipping, by the second terminal, to respond to the operation instruction when the current state of the screen is off.

6. The terminal screen-on/off control method of claim 1, further comprising disabling, by the second terminal, a function to reduce energy consumption of the terminal when the second terminal fails to detect the first terminal.

7. The terminal screen-on/off control method of claim 1, wherein the preset condition further comprises a preset button is touched twice.

8. A non-transitory computer-readable medium comprising computer-executable instructions, which when executed by a processor of an electronic device, cause the processor to:
  receive an operation instruction from a user using a first terminal;
  determine a current state of a screen of a second terminal when the operation instruction meets a preset condition, wherein the preset condition comprises a preset button is touched and held longer than a preset time threshold, and determine whether the second terminal is to turn the screen on/off;
  control, using the first terminal, the second terminal to turn off the screen when the current state of the screen is on;
  control, using the first terminal, the second terminal to turn on the screen, control a first application to respond to the operation instruction, and determine whether the first application runs in a foreground before the second terminal turns off the screen when the current state of the screen is off, wherein the first application is an application that is last used and that is not closed by the user before the second terminal turns off the screen;
  control, using the first terminal, the second terminal to turn on the screen and unlock the screen to display an interface of the first application, and control the first application to respond to the operation instruction in response to the first application running in the foreground; and
  control, using the first terminal, the second terminal to turn on the screen and display the interface of the first application in a screen-locked state, and control the first application to respond to the operation instruction in response to the first application not running in the foreground.

9. The computer program product of claim 8, wherein the instructions further cause the electronic device to be configured to control, using the first terminal, the second terminal to turn on the screen and unlock the screen to display the interface of the first application when the second terminal turns off the screen due to a timeout or the operation instruction from the user using the first terminal.

10. The computer program product of claim 8, wherein when the operation instruction does not meet the preset condition, the instructions further cause the electronic device to be configured to:
  determine the current state of the screen of the second terminal; and
  respond to the operation instruction using a second application when the current state of the screen is on, wherein the second application currently runs in the foreground of the second terminal.

11. The computer program product of claim 8, wherein the instructions further cause the electronic device to be configured to enable a function of turning the screen on/off using a device connected to the second terminal when detecting that the first terminal is connected to the second terminal, and wherein the function instructs the second terminal to turn the screen on/off based on the operation instruction received from the first terminal.

12. The computer program product of claim 8, wherein when the operation instruction does not meet the preset condition, the instructions further cause the electronic device to be configured to:
  determine the current state of the screen of the second terminal; and
  skip responding to the operation instruction when the current state of the screen is off.

13. The computer program product of claim 8, wherein the instructions further cause the electronic device to be configured to disable a function to reduce energy consumption of the terminal when detection fails.

14. A screen-on/off control system, comprising:
  a first terminal configured to:
    detect a first operation instruction;
    generate a first signal, wherein the first signal indicates the first operation instruction;
    detect a second operation instruction;
    generate a second signal, wherein the second signal indicates the second operation instruction; and
    transmit the first signal; and
  a second terminal comprising a display and configured to:
    receive the first signal from the first terminal;
    turn, using the first terminal, the display on and display a photographing interface in a screen-locked state when the first operation instruction meets a first preset condition and the display is off, wherein a user of the second terminal cannot browse a historical picture, and wherein the first preset condition comprises a preset button is touched and held longer than a preset time threshold; and
    perform photographing when the second operation instruction meets a second preset condition.

15. The screen-on/off control system of claim 14, wherein the photographing interface corresponds to a first application, and wherein the first application is not running before the second terminal receives the first signal.

16. The screen-on/off control system of claim 15, wherein the first terminal comprises a button, and wherein the first preset condition is the button is touched twice.

17. The screen-on/off control system of claim 15, wherein the first terminal is further configured to:
  determine a current state of the screen of the second terminal; and
  respond to the operation instruction by using a second application when the current state of the screen is on, where the second application is an application that currently runs in a foreground of the second terminal; or if the current state of the screen is off, skip responding to the operation instruction.

18. The screen-on/off control system of claim 14, wherein the first terminal comprises a selfie stick.

19. The screen-on/off control system of claim 14, wherein the second terminal comprises a mobile phone, a computer, an iPad, a smart television, or a game console.

20. The screen-on/off control system of claim 14, wherein the first preset condition further comprises a voice input by the user matches a preset voice.

* * * * *